Nov. 2, 1926.

F. L. KILLIAN 1,605,445

MACHINE FOR MANUFACTURING THIN RUBBER ARTICLES

Filed August 19, 1925    2 Sheets-Sheet 1

Inventor
Fred L. Killian
By F. E. Shannon
Attorney

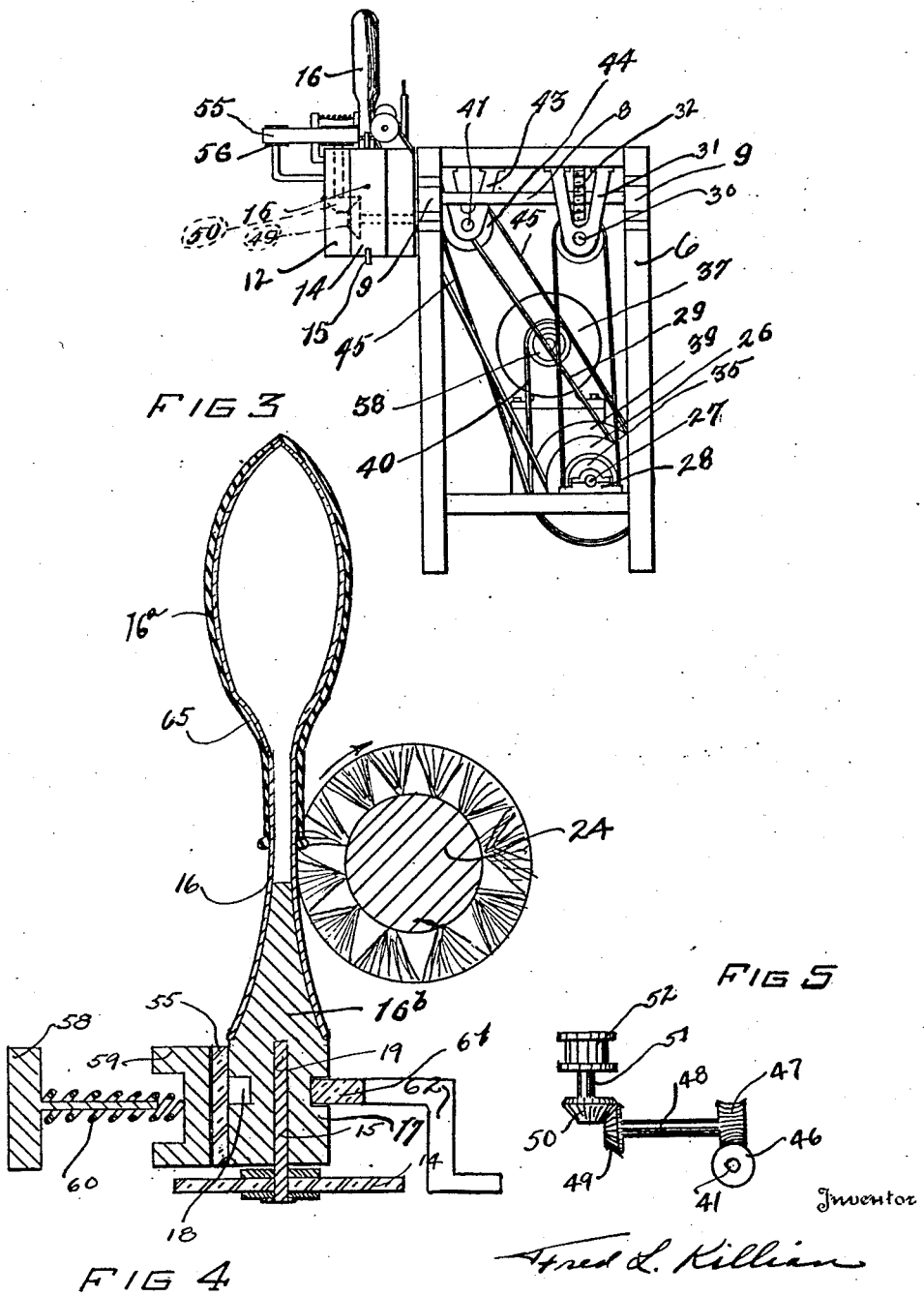

Patented Nov. 2, 1926.	BEST AVAILABLE COPY	1,605,445

UNITED STATES PATENT OFFICE.

FRED L. KILLIAN, OF AKRON, OHIO.

MACHINE FOR MANUFACTURING THIN-RUBBER ARTICLES.

Application filed August 19, 1925. Serial No. 51,130.

This invention relates to new and useful improvements in machines for manufacturing thin rubber articles and has particular reference to a new and novel means for forming an annular bead on the open ends of rubber balloons, finger cots, nipples, gloves and other tubular articles.

The invention is especially designed to form a grommet, commonly known as a bead on the open end of tubular rubber articles manufactured by the dipping process and has for its object the provision of simple, durable means for rolling the open end of an uncured article back upon itself to form a bead of uniform cross section.

A further object of the invention is to provide mechanical means for rapidly and economically rolling said beads whereby rubber articles of the class above described may be more economically and uniformly produced.

The above and additional objects are accomplished by the novel construction, of the several parts and the combination and arrangement of parts hereinafter described with reference to the accompanying drawings wherein I have illustrated a preferred form of the invention, it being understood that the invention is capable of various adaptations and that changes and modifications may be made or substitutions resorted to which come within the spirit of the invention as set forth in the appended claims.

In the drawings like characters of reference are employed in referring to like parts as the same may be shown in any of the several views, and in which:—

Figure 3 is an end elevational view of same.

Figure 4 is a vertical, sectional view of a form with a rubber balloon thereon and showing in cross section certain parts of the machine, the same being taken as indicated by the lines 4—4 of Figure 2.

Figure 5 is an elevational view somewhat diagrammatic in character illustrating the driving connection between certain parts of the machine.

Figure 1:
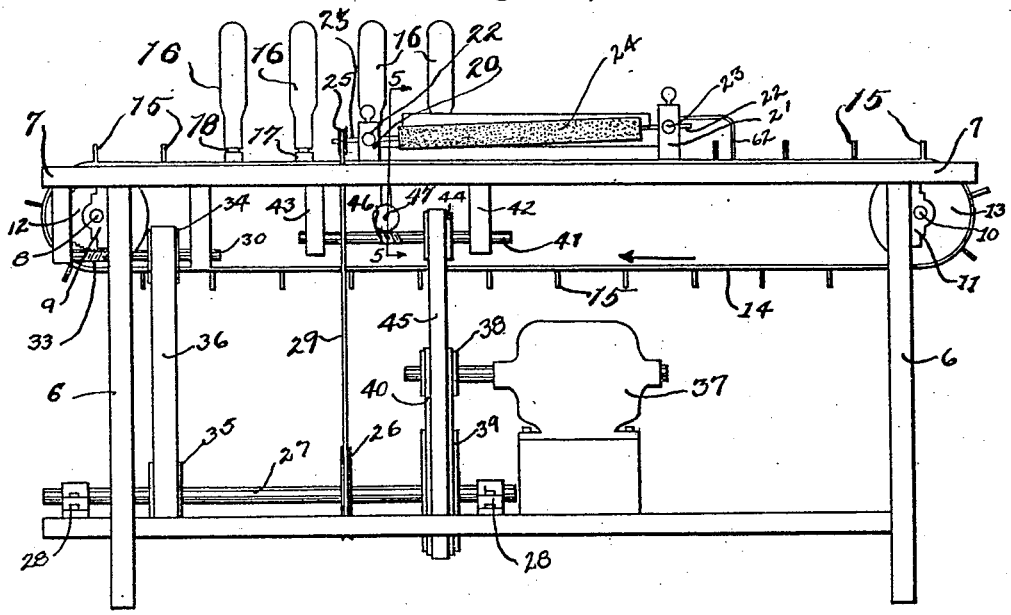
Figure 1 is an elevational view showing a machine constructed in accordance with this invention.
Figure 2:
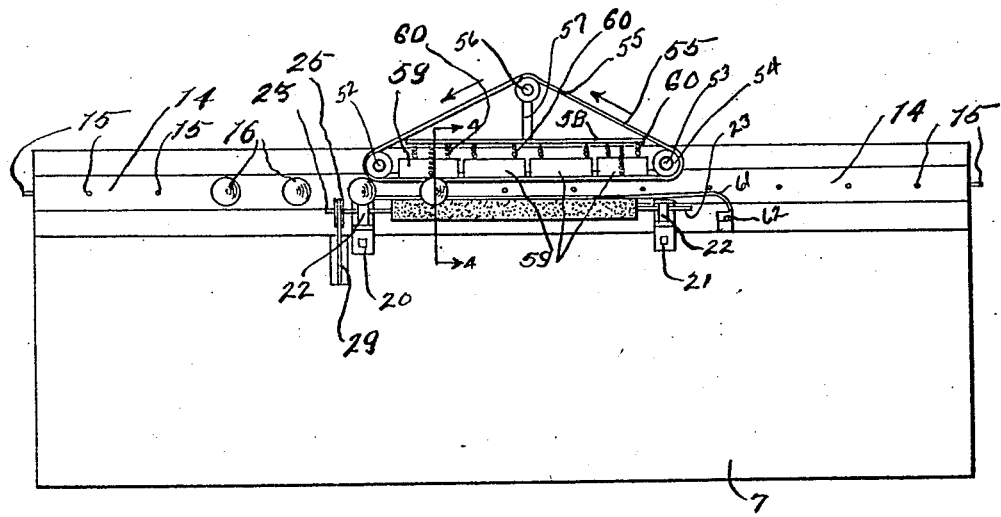
Figure 2 is a top plan view of same.

Proceeding now to a detailed description of the invention with reference to the adaptation thereof disclosed in the accompanying drawing, the numeral 6 is used to denote a suitable frame. The frame 6 is provided with a flat top 7. The frame 6 is provided adjacent the ontake end thereof with a horizontal shaft 8 which is mounted in suitable bearings 9 and extends transversely of the frame 6, in a plane just below the table 7. A similar shaft 10 is mounted in a suitable bearing 11 so as to extend across the offtake end of the machine. Both of the shafts 8 and 10 project forwardly from the machine and the shaft 8 is provided on the forward end thereof with a pulley 12 which is positioned with the upper edge thereof projecting slightly above the top of the table 7. A similar pulley 13 is mounted on the forward end of the shaft 10 with the top thereof likewise positioned slightly above the top of the table 7. An endless conveyor belt 14 is operatively mounted on the pulleys 12 and 13 so as to extend longitudinally of the machine. The conveyor belt 14 is provided at regularly spaced intervals with upwardly projecting pins 15 which are riveted or otherwise secured thereto. The numeral 16 is used generally to denote forms which may be of any suitable construction. The main body of the form 16$^a$ and the base 16$^d$ may be formed of one piece of material. The main body 16$^a$ is preferably formed of glass or other relatively thin material and is provided with a base in the form of a plug 16$^b$. The lower end of the base 16$^b$ is cylindrical and is provided with a circumferentially extending groove 18, thus forming an annular flange 17. The base 16$^b$ is also provided with an axial bore 19 which is adapted to receive the pin 15. The numerals 20 and 21 denote brackets which are secured in spaced relation to each other centrally of the machine and at points adjacent the forward edge of the table 7. The brackets 20 and 21 carry suitable bearings 22 in which is mounted a shaft 23. A cylindrical brush 24 is mounted on the shaft 23 and is arranged with circumferential edge thereof in the path of the forms 16 as the same are carried through the machine by the belt 14 as hereinafter described.

The bearings 22 on the bracket 21 are positioned in a plane slightly above the plane of the bearings 22 on the bracket 20, whereby the brush is mounted at a slight inclination to the top of the table 7. One end of the shaft 23 is provided with a pulley 25 which is in alinement with the pulley 26 on the drive shaft 27 which is journaled in suitable bearings 28 mounted on the lower part of the frame. A flexible driving member 29 is operatively positioned upon the pulleys 26 and 25 whereby a rotation of the shaft 27 will cause a rotation of the brush 24.

The shaft 30 is mounted on a suitable bracket 31 so as to extend transversely of the shaft 8. A worm gear 32 is mounted on the shaft 8 at a point directly above the shaft 30. The shaft 30 is provided with a worm 33 which is in mesh with the gear 32 on the shaft 8 whereby a rotation of the shaft 30 will rotate the shaft 8 and the drive pulley 12 thus causing the belt 14 to move longitudinally of the table 6. The pulley 34 is mounted on the shaft 30 in alignment with the pulley 35 on the drive shaft 27. The pulleys 34 and 35 being operatively connected by means of the drive belt 36.

An electric motor 37 having a drive pulley 38 is mounted on the frame 6 and the shaft 27 is provided with a drive pulley 39 which is in alinement with the pulley 38. The pulleys 38 and 39 are operatively connected by means of the drive belt 40.

A shaft 41 is journaled in suitable brackets 42 and 43 which are suitably secured to the underside of the table 7. The shaft 41 is provided with the pulley 44 at a point in alinement with the pulley 39 and the pulleys 39 and 44 are operatively connected by a drive belt 45. The shaft 41 is provided with a worm 46 which is operatively meshed with a worm gear 47 on the shaft 48. The shaft 48 is journaled in suitable brackets so as to extend forwardly from the shaft 41. The forward end of the shaft 48 is provided with a beveled gear 48 which is in mesh with like gear 50 on an upright shaft 51 which is journaled to the frame 6 at a point rearwardly from the belt 14. A drive pulley 52 is mounted on the upper end of the shaft 51. A like shaft 53 is mounted on the table 7 at a point forwardly from the brackets 21. The shaft 53 is provided with a pulley 54 and a drive belt 55 is operatively mounted around the pulleys 52 and 54. The belt 55 extends longitudinally of the machine so as to engage the bases 16ᵇ on the forms 16 and impart to said forms a rotary movement while the same are carried forward in contact with the brush 24. The numeral 56 denotes a pulley which is mounted on a bracket 57 to provide means for tightening the belt 55. A bar 58 is positioned between the pulleys 54 and 52 and a plurality of blocks 59 are positioned against the belt 56. The springs 60 are compressed between the bar 58 and each of the blocks 59 to cause said blocks to bear constantly against the belt 55, thus providing positive means whereby the belt 55 will engage the plugs 17 on the forms 16.

The numeral 61 denotes a strip which extends longitudinally of the machine so as to be entered in the annular grooves 18 on the forms 16, thus providing means to retain the forms 16 on the pin 15 during the operation of the brush 24. The strip 61 is mounted on suitable brackets 62 which are connected to the frame 6.

In manufacturing rubber balloons and the like, the forms 16 are first dipped in rubber to form a thin rubber article 65. The forms are placed on the pins 15 at the ontake end of the machine and are carried forwardly to the brush 24. Before reaching the brush 24, the form contacts with the strip 62 which enters the groove 18 and which prevents the form 16 from being moved upwardly on the pin 15 by the action of the brush 24. The belt 55 is preferably driven at a relatively greater speed than the belt 14. As the forms are carried forwardly by the belt 14 the same are brought into contact with the rapidly moving belt 55 which causes a rotary movement of the form 16 on the pin 15. The brush 24 is then brought into contact with the longer edge of the thin rubber article 65 and the same is forced upwardly. The rotation of the brush 24 and the rotation of the form 16 causes the lower edge of the article 66 to roll upwardly and form a perfect annular bead. The forms 16 are removed from the pins 15 at the offtake end of the table 7.

While I have shown and described a conveyor belt 14, it is understood that any form of conveyor may be used and while I have shown preferred means for driving the various elements herein described, any suitable driving connection may be employed.

In the drawings I have shown the member 24 in the form of a brush having outwardly presented bristles, but it is to be understood that the word is used in a broad sense and that any suitable roller or revolving element may be used. The brush is also described as cylindrical, but it may be formed with slightly conical surface or otherwise varied in form in accordance with the shape of the form or the nature of the goods to be manufactured.

In the preferred form of the invention illustrated, the portion of the belt 55 which is in contact with the forms is driven in the same direction as the upper portion of the belt 14, but the belt 55 may be driven in the opposite direction if desired, or it may be held stationary and the forms revolved by frictional contact therewith.

It will be seen that by detachably and rotatably mounting the forms on the conveyor and by providing driving means which directly engage the form and give it a rotary movement, while it is in contact with the brush, that I have provided new and novel means for forming an annular bead on the open end of uncured rubber.

Having thus illustrated my invention and described the same in detail, what I claim is new and desire to secure by Letters Patent is:—

1. In a device of the class described, a conveyor, a plurality of spaced pins fixed to said conveyor so as to project therefrom, a plurality of forms, each provided with a base having an axial bore adapted to receive one of said pins, whereby the forms may be rotatably mounted thereon, an annular flange on said base, an elongated brush positioned longitudinally of said conveyor and arranged to contact with forms mounted on said pins, means to drive said conveyor, means to rotate said brush, means to engage said flange and prevent an upward movement of the forms while the same are in contact with said brush, and friction means directly engaging said forms to impart a rotary movement thereto while the same are in contact with said brush.

2. In a device of the class described, a suitable frame, a conveyor, a plurality of spaced pins secured to said conveyor so as to project at a right angle therefrom, a plurality of forms, each provided on the bottom thereof with an axial bore adapted to receive one of said pins, each form adapted to be rotatably mounted on one of said pins, and each provided with a groove which extends circumferentially thereof in a plane in spaced relation to the bottom thereof, a cylindrical brush positioned longitudinally of said conveyor and arranged to contact with the forms mounted on said pins, means to drive said conveyor, means to rotate said brush, a strip positioned on said frame and arranged longitudinally of said conveyor, said strip adapted to be entered in said groove to prevent an upward movement of the forms on said pins; a flexible driving belt mounted longitudinally of said conveyor, said belt arranged to frictionally engage said forms to rotate the same on said pins while in contact with said brush and means to drive said belt.

3. In a device of the class described, an endless conveyor, a plurality of regular spaced pins fixed to said conveyor so as to project therefrom, a plurality of forms, each provided in the bottom thereof with an axial bore adapted to receive one of said pins, whereby the forms may be rotatably mounted thereon, an elongated brush positioned longitudinally of said conveyor and arranged to contact with said forms, a flexible driving belt mounted on said frame longitudinally of said conveyor, yieldable means to press said belt directly against said forms, means to rotate said brush, drive said conveyor and drive said driving belt whereby the forms will be rotated while being carried forward in contact with said brush.

4. In a device of the class described, a suitable frame, an endless conveyor mounted for movement therethrough, a plurality of spaced pins fixed to said conveyor so as to project at a right angle therefrom, a plurality of forms, each provided in the bottom thereof with an axial bore adapted to receive one of said pins, said forms adapted to be rotatably mounted on said pins, each form provided adjacent the bottom thereof with an annular groove, a cylindrical brush positioned along one side of said conveyor and extending longitudinally thereof, said brush arranged to contact with said form, a flexible driving belt positioned along the other side of said conveyor whereby forms carried by said conveyor will be received between said belt and said brush; means to simultaneously rotate said brush, drive said conveyor and drive said driving belt whereby the forms will be directly engaged by said belt and rotated while being carried forward in contact with said brush.

5. In a device of the class described, a rotatable brush, a driving belt operating longitudinally of said brush in spaced relation thereto, means to rotate said brush, means to drive said belt and means to move forms forwardly between said brush and belt with the forms in direct contact with both the brush and belt.

6. In a device of the class described, a rotatably mounted cylindrical brush, a belt operable longitudinally thereof, means to successively move forms longitudinally therebetween with both the brush and belt in direct contact with said forms.

7. In a device of the class described, a rotatably mounted brushing element, form rotating means extending longitudinally thereof, means to move forms forwardly therebetween in direct contact with both the rotating means and the brush.

8. In a device of the class described, a suitable frame, a conveyor mounted thereon, means to detachably and rotatably secure forms to said conveyor, whereby the same will be carried forward in an upright position, a cylindrical brush mounted longitudinally of said conveyor, said brush arranged to operatively engage the forms mounted on said conveyor, means to drive said conveyor, means to rotate said brush and means frictionally engaging said forms to impart a rotary movement thereto while the same are carried forward in contact with said brush.

9. In a device of the class described, a conveyor, means to detachably and rotatably mount forms on said conveyor whereby the same may be carried forward in an upright position, a rotatable brush mounted on an axis directed longitudinally of said conveyor, said brush arranged to operatively engage the forms mounted on said conveyor, means to drive said conveyor, means to frictionally engage and rotate said forms while the same are carried forward in contact with said brush.

10. In a device of the class described, a suitable frame, a conveyor arranged to carry forms forwardly thereof, means to detachably and rotatably secure forms to said conveyor whereby the same may be carried forward in an upright position, a cylindrical brush mounted longitudinally of said conveyor, said brush arranged to operatively engage the forms mounted on said conveyor, means to drive said conveyor, means to rotate said forms, said means frictionally contacting directly with the forms on the side opposite the brush, and means to hold said forms from upward movement while the same are carried forward in contact with said brush.

11. In a device of the class described, a suitable frame, means to engage and move forward, a plurality of forms, a cylindrical brush mounted longitudinally of said conveyor, and arranged to contact with one side of said forms, means to drive said conveyor to move said forms longitudinally along said brush, means to rotate said brush whereby the side contacting with said forms will travel upwardly relative thereto, means to limit the upward movement of said forms and means to rotate the forms, said means directly engaging the forms while the same are in contact with said brush.

12. In a device of the class described, a suitable support, a conveyor mounted for movement thereon, a plurality of forms rotatably mounted on said conveyor, a cylindrical brush mounted adjacent said conveyor and arranged to contact with one side of said forms, means to drive said conveyor to move said forms longitudinally along said brush, means to rotate said brush so that side contacting with said forms will move upwardly relative thereto, means to limit the upward movement to said forms, a driving belt positioned longitudinally of said conveyor, means to yieldably hold one face of the driving belt in contact with said forms and means to drive said driving belt.

13. In a device of the class described, a suitable frame, a cylindrical brush mounted thereon, means to convey forms forwardly along said brush, means to rotate said brush so that side contacting with said forms will move upwardly relative thereto, means to limit the upward movement to said forms and a driving belt arranged to directly contact with and rotate said forms.

14. In a device of the class described, a suitable frame, a cylindrical brush mounted thereon, means to convey forms forwardly along said brush, means to rotate said brush so that side contacting with said forms will move upwardly relative thereto, means to limit the upward movement to said forms and a driving belt arranged to contact with and rotate said forms, means to yieldably hold one face of the driving belt in contact with said forms and means to drive said driving belt.

15. In a device of the class described, a rotary brush, means to carry forms into operative engagement with said brush and means to directly engage and rotate said forms.

16. In a device of the class described, a rotary brush, means to successively move forms in operative engagement with said brush and means to frictionally engage and rotate said forms.

17. In a device of the class described, an elongated rotatable brush, means to convey a plurality of forms in operative engagement throughout the length of said brush and means operating directly on the forms to rotate said forms while the same are engaged by said brush.

18. In a device of the class described, an elongated rotatable brushing member means to rotate said member, means to bring a plurality of forms into operative engagement with said member and convey said forms while so engaged along the length of said member and means to rotate the forms while the same are engaged by said member, said means operating directly on said forms.

19. In a device of the class described, an elongated rotatable brush, means to bring a plurality of forms into operative engagement with said brush and convey the same along the length thereof while the same are in operative engagement therewith and means to frictionally engage the lower portion of said forms to cause a rotation thereof while the same are engaged by said brush.

20. In a device of the class described, a rotatable brush means to convey forms longitudinally thereof and in operative engagement therewith, a flexible member adapted to directly engage said forms and cause a rotation thereof while so engaged and yieldable means to maintain said flexible member in forced contact with said forms.

In testimony whereof I have hereunto set my hand.

FRED L. KILLIAN.